A. T. AMES.
AUTOMATIC COUPLING AND AIR VALVE OPERATING MECHANISM.
APPLICATION FILED NOV. 19, 1912.
1,087,862.
Patented Feb. 17, 1914.
6 SHEETS—SHEET 1.
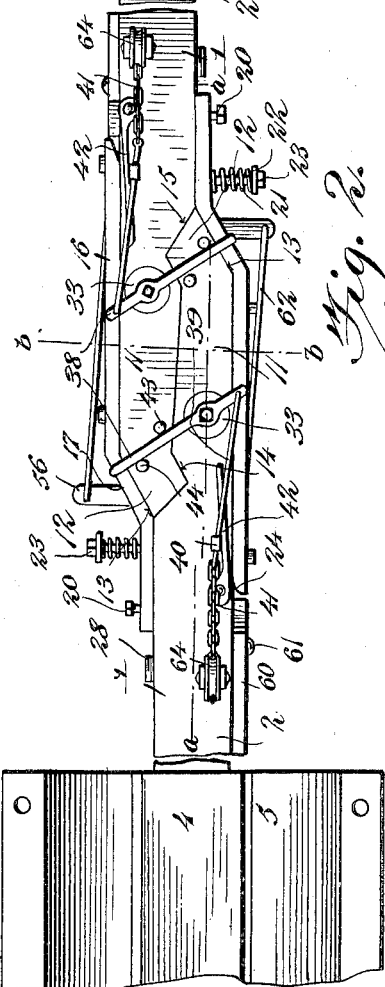
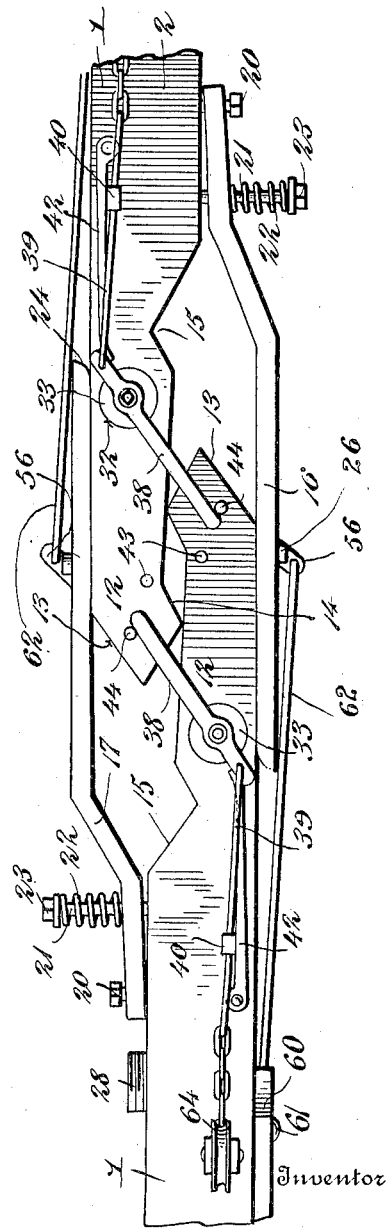

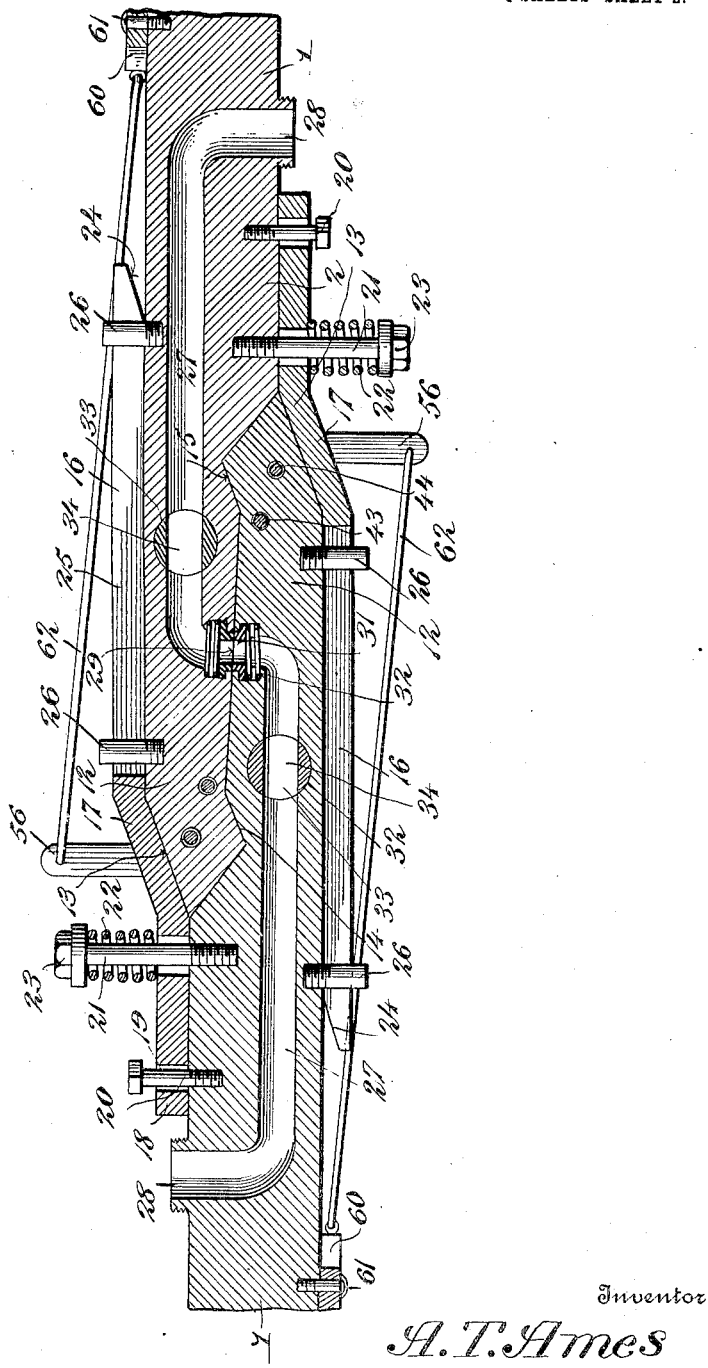

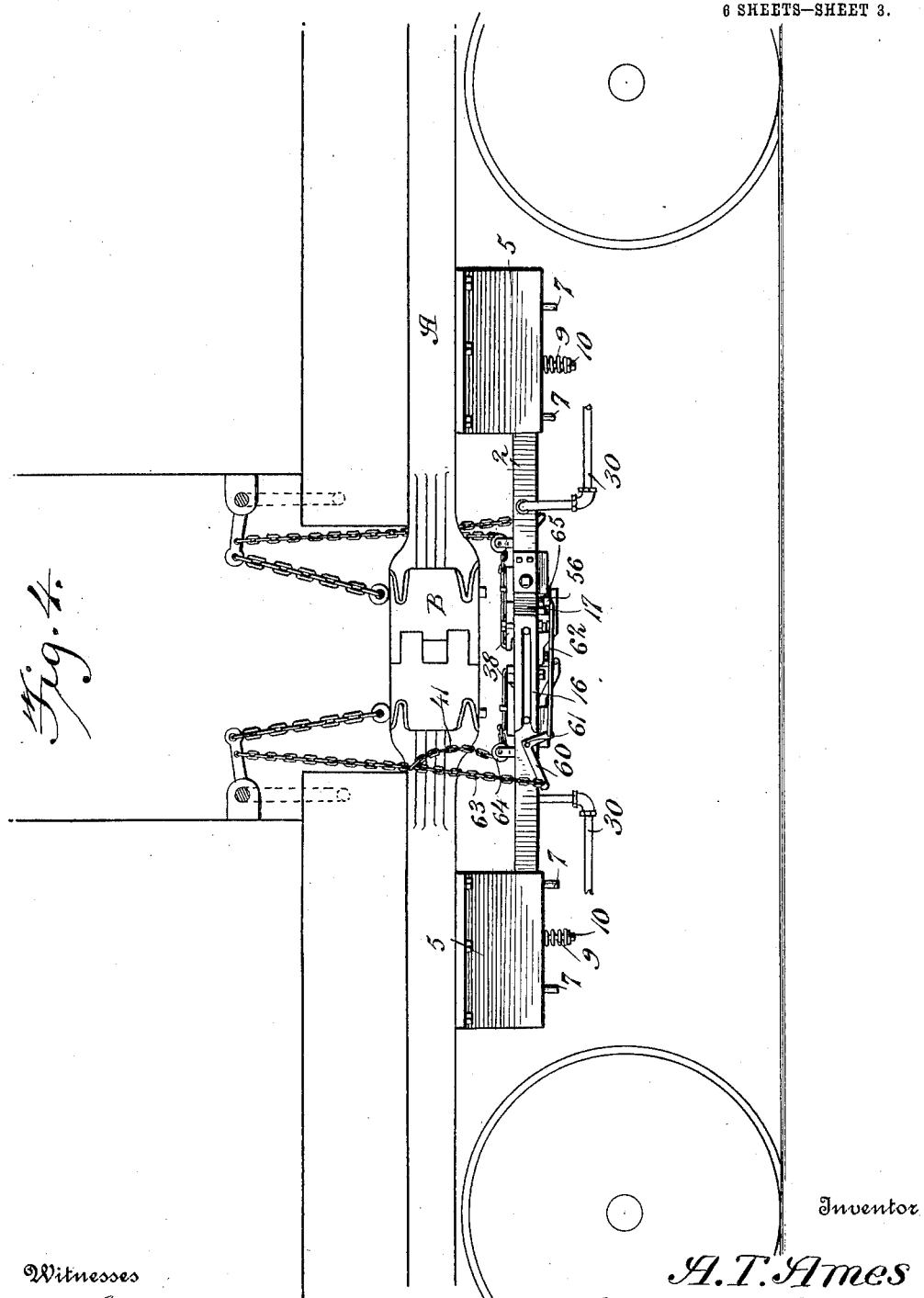

A. T. AMES.
AUTOMATIC COUPLING AND AIR VALVE OPERATING MECHANISM.
APPLICATION FILED NOV. 19, 1912.

1,087,862.

Patented Feb. 17, 1914.
6 SHEETS—SHEET 4.

*Fig. 5.*

Witnesses
W. S. McDowell
J. W. Garner

Inventor
A. T. Ames

By Victor J. Evans
Attorney

A. T. AMES.
AUTOMATIC COUPLING AND AIR VALVE OPERATING MECHANISM.
APPLICATION FILED NOV. 19, 1912.
1,087,862.
Patented Feb. 17, 1914.
6 SHEETS—SHEET 5.
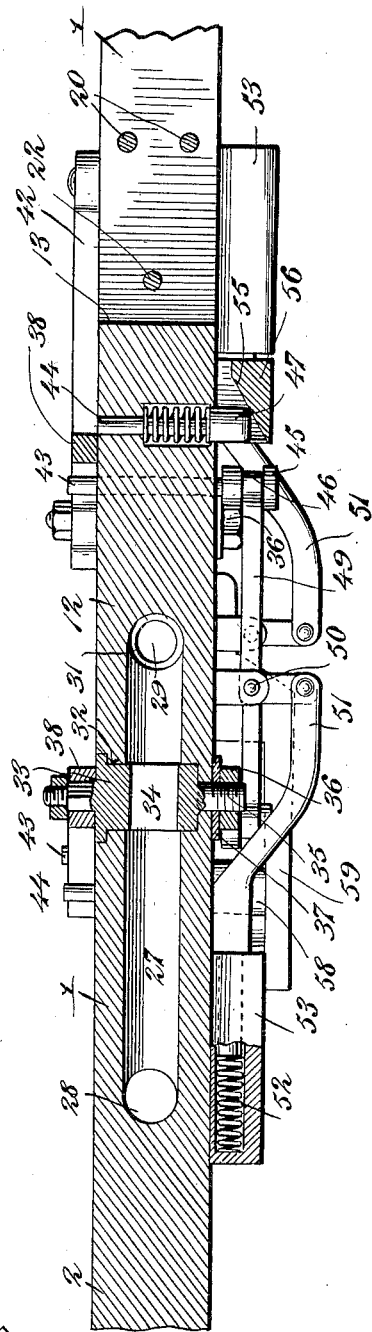
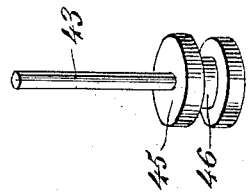
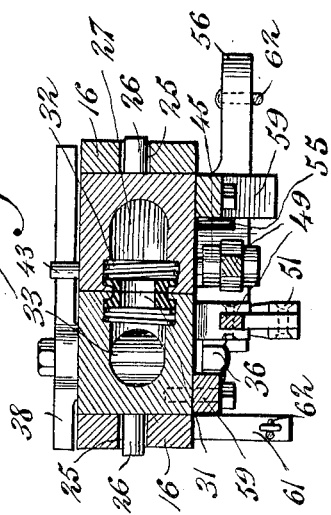
Witnesses
Inventor
A. T. Ames
By Victor J. Evans
Attorney

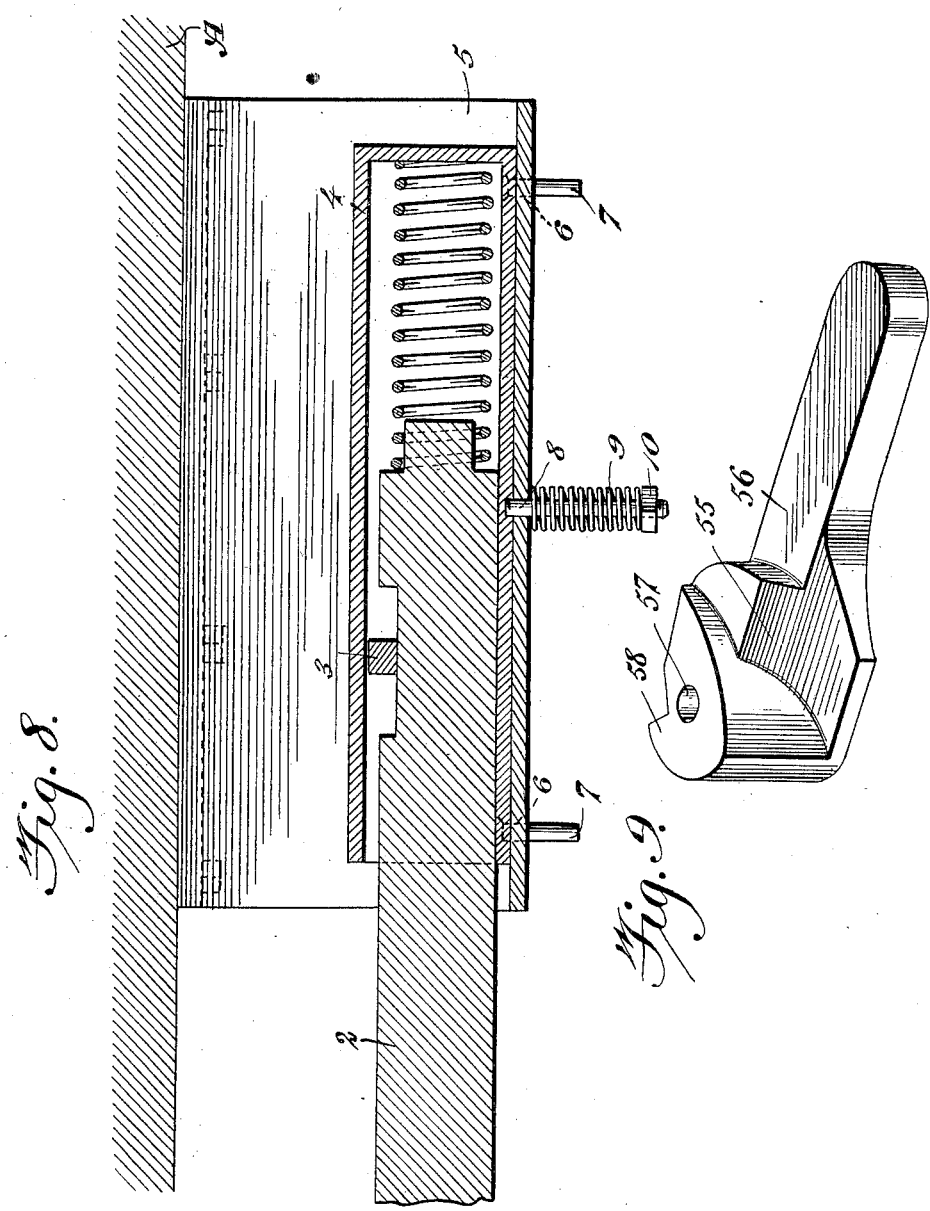

UNITED STATES PATENT OFFICE.

ARTHUR T. AMES, OF BLANCHARD, MAINE.

AUTOMATIC COUPLING AND AIR-VALVE-OPERATING MECHANISM.

1,087,862. Specification of Letters Patent. Patented Feb. 17, 1914.

Application filed November 19, 1912. Serial No. 732,308.

*To all whom it may concern:*

Be it known that I, ARTHUR T. AMES, a citizen of the United States, residing at Blanchard, in the county of Piscataquis and State of Maine, have invented new and useful Improvements in Automatic Coupling and Air-Valve-Operating Mechanism, of which the following is a specification.

This invention is an improved automatic coupling and air valve operating mechanism for automatically coupling the air hose or train pipe of an air brake apparatus between the cars and for also automatically operating the air valves, the invention consisting in the construction, combination and arrangement of devices hereinafter described and claimed.

The object of this invention is to provide means for automatically coupling the air hose between the cars when the cars run together and at the same time automatically opening the air valves and for also, when the cars are uncoupled, automatically closing the air valve of the front car and momentarily opening the air valve of the rear car, so as to cause the air brakes to be applied to the rear car.

A further object of the invention is to effect improvements in the construction of the coupling heads.

A further object is to provide improved means for guiding the coupling heads together.

A further object is to provide improved means for automatically operating the air valves when the cars are coupled and uncoupled, another object being to provide means for also manually operating the air valves.

In the accompanying drawings:—Figure 1 is a plan of an air hose coupler and air valve operating mechanism constructed in accordance with my invention, showing the heads coupled. Fig. 2 is a similar view of the same, showing the heads uncoupled. Fig. 3 is a horizontal longitudinal sectional view of the same with the heads coupled. Fig. 4 is a side elevation of the same. Fig. 5 is an inverted plan of the same. Fig. 6 is a detail longitudinal sectional view on the plane indicated by the line *a—a* of Fig. 1. Fig. 7 is a similar view on the plane indi- by the line *b—b* of Fig. 1. Fig. 8 is a detail transverse sectional view on the plane indicated by the line *c—c* of Fig. 1. Fig. 9 is a detail perspective view of one of the cam levers. Fig. 10 is a detail perspective view of one of the vertically movable tappet pins.

In accordance with my invention, I provide a pair of coupling heads 1 for attachment to the ends of cars, each head being provided with a supporting bar or arm 2. Each arm 2 is secured by a key 3 in a box 4, the box bears on the bottom of a bracket 5, which, in practice is bolted to the under side of the draw bar A of an ordinary car coupler B so that my improved air hose coupling and air valve operating mechanism is carried by and directly under the car couplers. The bracket 5 is provided with vertical openings 6 and the box 4 has downwardly extending guide studs 7 which operate in said openings and permit vertical movement of the box 4 and, hence, of the coupler head to some extent. The box 4 is also provided on its under side with a centrally located downwardly projecting stem 8 on which is a coiled spring 9 which bears against the under side of the bracket and also against the nut 10 which is secured to the lower end of the said stem. The function of this spring is to normally hold the box 4 snugly against the bottom of the bracket and yet permit of slight vertical movement of said box with the coupler head carried thereby. Each coupler head comprises an arm 11 which is straight and is slightly tapered toward its outer end and is provided at its outer end with an oblique arm 12 which is substantially diamond-shaped, the front end of the arm 12 having forwardly converging sides 13 and the said arm having its rear inner side formed by a bevel 14. At the inner end of the arm 11 of each coupler head, on the inner side thereof, is a recess 15, which is shaped to fit the corresponding inner side of the arm 12 of the other coupler head so that when the coupler heads are in coupled relation, their arms 11 are arranged side-by-side and the arm 12 of each coupler head has its inner side engaged with the recess 15 of the other arm 11 so that the coupler heads are interlocked.

Each coupler head is provided on one side with a guide arm 16 which has an oblique portion 17 near its inner end, its extreme inner end portion 18 being pivotally connected as at 19 to one side of the bar or arm 2, the pivotal connection being here shown as formed by screws 20 which are secured to the bar 2 and which pass through openings in the part 20 of the guide arm, the said openings being of slightly larger diameter than the stems or shanks of the screws. Hence, the guide arms are adapted to move angularly with respect to the arms 11 of the coupler heads and toward and from said arms 11. From each bar 2 projects a guide stem 21 which extends through an opening in the guide arm and carries a spring 22 which bears against the outer side of the guide arm and the head or nut 23 on the outer end of the said stem, the said guide arms being thus, by the action of the said springs, normally moved toward the arms 11 of the coupler heads. The length of the guide arms is such that their front ends project somewhat beyond the corresponding ends of the arms 11 of the coupler heads and the said guide arms have their ends beveled on their inner sides as at 24. Each guide arm has a longitudinal slot 25 which extends from the front end thereof to a point near the oblique portion 17, said slots being open at and slightly widening toward the front ends of the arms. Each coupler head has guide pins or studs 26 which project from the outer side of its arm 11. When the coupler heads come together the diamond-shaped arms 12 thereof coact with the guide arms 16 to cause the coupler heads to fit snugly together each with its arm 11 between the corresponding arm and the guide arm of the other head as shown in Fig. 1. When the cars are uncoupled, the spring pressed guide arms 16 yield and move outwardly to permit the oblique terminal arms 12 to slip out of the recesses 15. Each coupler head has a duct 27 open as at 28 at a point on one side of the bar 2 and also open as at 29 at a point on the inner side of the arm 11 and substantially midway between the ends of said arm. The air hose or drain pipe 30 of the air brake apparatus of each car is connected to the duct 27 at the point 28 and the end 29 of each duct is fitted with a packing gasket 31 which is pressed by a spring 32. Hence, when the coupler heads are in coupled relation their respective ducts 27 are connected at the points 29 and an airtight joint is effected between them by the said spring pressed packing gaskets, as will be understood.

Each coupler head has its arm 11 provided with a cylindrical recess 32 which intersects the duct 27 and in which is fitted a plug valve 33 with a transverse opening 34 that may be turned into or out of communication with the duct 27 so that the said valve may open or close said duct. Each valve is held in place in its seat or recess 32 by a downwardly extending stem 35 on which is a nut 36 and a washer 37 and on the upper end of each valve is secured an operating arm 38. To the outer shorter end of each operating arm is connected a link 39 which operates in a guide 40 and to which a chain 41 is attached. The longer end of each arm 38 extends across the arm 11 of the other coupler head when the device is coupled. On the upper side of each coupler head is a spring 42 which, when the valve is turned to closed position is engaged by the shorter end of the operating arm 38 of the valve, the said springs serving to limit the angular movement of the valves and their operating arms and also serving after the valves have been moved to closed position to give them an impulse in the opposite direction.

Each coupler head has a pair of tappet pins 43—44 arranged at a suitable distance apart, these tappet pins extending through vertical openings with which the arms 11 of the coupler heads are provided and being movable in the direction of their own length in the said vertical openings. The pin 43 is provided with a head 45 at its lower end which head has a circumferential groove 46. Each pin 44 has a head 47 at its lower end provided with a rounded lower side. The said tappet pins 43—44 are so located that when the device is coupled and the valves are open the long end of the operating arm 38 of each valve is arranged between the pins 43—44 of the other coupler head. The pins 43 are normally projected to bear against one side of the operating arms of the valves to lock the valves in open position. To normally hold the said pins in projected position, I provide each coupler head with a bell crank 49 on its under side which is pivotally mounted as at 50 and has its long arm engaged with the groove 46 of the head of said pin. The short arm of each bell crank is pivotally connected to a longitudinally movable presser link 51 which is actuated by a spring 52, the said spring and the inner end of the said link being held in a housing guide 53 which is also secured to the under side of the coupler head. The presser link is provided on one side with a cam 54.

Each pin 44 is normally, by the action of a spring 44ª, arranged in retracted position with its upper end flush with the upper side of the coupling head which carries said pin and with its head or lower end bearing on the inclined cam surface 55 of a lever 56 which is pivotally mounted on the under side of the same coupler head as at 57, the said lever 56 being also provided, at its inner end, with a cam arm 58 for engagement with the cam 54 of the presser link 51 of the other coupler head, as shown in Fig. 5. Guide arms 59 are provided for the cam levers 56 which guide arms are secured to the under sides of the coupler heads and bear against the under sides of the said cam levers. Each coupler head is also provided with a manually operated bell crank lever 60 pivotally mounted as at 61 on one side and one arm of which is connected by a link 62 to the cam lever 56 of the same coupler head. An operating chain 63 is connected to the other arm of the said lever 60 and also to the chain 41, the last mentioned chain engaging a direction pulley 64. These chains are, in practice, connected to the manually operated levers which are employed in uncoupling the cars and, hence, when the cars are uncoupled the said chains are pulled at the same time and, hence, actuate the bell crank lever 60 and the lever operating arm 38 of the coupler which is connected to the car whose coupling lever is actuated. The chain 41 is somewhat slack so that the lever 60 is operated somewhat ahead in point of time of the lever operating arm. The upper arm of the lever 60 is longer and heavier than the lower arm thereof so that the lever 60 by its own gravity normally retains the cam lever 56 in position in contact with a stop 65 on the guide arm 59 and with its cam face 55 in such relation to the head of the pin 44 as to cause the latter to be in lowered retracted position.

The operation of my improved air coupling and air valve operating mechanism is as follows: When the cars come together and the coupling heads become arranged in coupled relation, the pins 43 engage the valve operating arms 38 and cause the said arms to turn the valves to open position so that the air brake apparatus is connected through the ducts 27 between the cars.

When uncoupling the cars, the lever of a forward car is operated to release the coupling jaw and this action of the lever draws upon the chains 41—63 in the manner herein before described of the coupling head which is carried by the forward car. The chain 63 turns the bell crank 60 sufficiently to cause the latter through the instrumentality of the link 62 to turn the cam lever 56 of the said coupling head forwardly thus causing the said cam lever to raise the pin 44 of the forward coupling head and such movement of the said cam lever causes its cam 58 by engagement with the cam 54 of the presser link 51 of the other coupling head to cause the said presser link to partly turn the bell crank 49 of the other coupler head and cause said bell crank to move the pin 43 of the other coupler head downwardly so that the said pin becomes disengaged from the arm 38 of the valve of the forward coupler head. By this time the chain 41 draws on the arm 38 of the valve of the forward coupler head and turns said valve to closed position so that the brakes of the forward car are not affected but the projected pin 44 of the forward coupler head, owing to the movement of said forward coupler head away from the rear coupler head engages the lever 38 of the valve of the rear coupler head and closes said valve but not until after the said valve has been kept open a sufficient length of time to permit the escape of air from the opening 29 of the rear coupler head and, hence, cause the brakes to be set on the rear uncoupled car or cars. As the pin 44 moves past the outer end of the arm 38 of the valve of the rear coupler head, the opposite end of the said arm is engaged with the spring 42 of the rear coupler head, the said spring acting as a buffer for the said arm and as the pin 44 clears the said arm, the said spring reacts and, hence, moves the said arm reversely a sufficient distance to return the arm to a position within the path of the pin 43 of the coacting coupler head of the front car so that when the cars are again run together the pins 43 by engagement with arms 38 will turn the valves to open position.

I claim:—

1. A pair of air hose coupling heads each provided with an air valve, means on each head to lock the air valve of the other head in open position when the heads are coupled, means on each head to close the air valve of the other head as the heads pull apart, manually operated means carried by each head to set the valve closing means of said head in position for operation and to release the valve locking means of the other head, and manually operated means on each head to close the valve thereof.

2. A pair of air hose coupling heads each provided with an air valve having an operating arm to extend across the other coupling head and each also provided with a valve opening pin and a valve closing pin, a cam lever carried by each coupling head and arranged to operate the valve closing pin thereof, means carried by each coupling head and actuated by the cam valve of the other coupling head to operate the valve opening pin, and manually operated means on each coupling head to close the valve thereof and to also cause the cam lever to project the pin thereof which closes the valve of the other head.

3. A pair of air hose coupling heads each provided with an air valve having an operating arm, each coupling head also having a movable opening pin and closing pin to operate the arm of the valve on the other head, a buffer and returning spring for said arm, a lever to project the closing pin, means to operate the opening pin, the opening pin operating means of each coupling head being actuated by the closing pin operating lever of the other head, and manually operated means carried by each coupler head to operate the said lever thereof and to also operate the valve thereof.

4. A pair of air hose coupling heads each provided with an air valve, means on each head to lock the air valve of the other head in open position when the heads are coupled, means on each head to close the air valve of the other head as the heads pull apart, means carried by each head to set the valve closing means of said head in position for operation and to release the valve locking means of the other head, and means on each head to close the valve thereof.

5. A pair of air hose coupling heads each having an arm recessed on one side to receive the arm of the other head, each arm terminating at its front end in a laterally inclined substantially diamond-shaped arm and being provided at its inner end with a recess to fit the inner side of the diamond-shaped arm of the other head, pivotally mounted guides on the said coupler heads to engage the outer sides of the said arms, and springs pressing inwardly on said guides, the said guides having longitudinal slots open at their front ends and each coupler head having guide pins to enter said slots.

6. The combination with car carried supporting brackets, a pair of air hose coupling heads each having a rearwardly extending bar and a box in which said bars are detachably secured and also secured for longitudinal movement, said boxes having depending guide studs extending through openings in the brackets, each box also having a downwardly projecting stem extending through an opening in the bottom of one the brackets, coiled springs on said stems bearing against the bottoms of the brackets, and nuts on the stems bearing against the lower ends of said springs.

In testimony whereof I affix my signature in presence of two witnesses.

ARTHUR T. AMES.

Witnesses:
F. B. PEOSE,
R. W. DAVIS.

Copies of this patent may be obtained for five cents each, by addressing the "Commissioner of Patents, Washington, D. C."